UNITED STATES PATENT OFFICE.

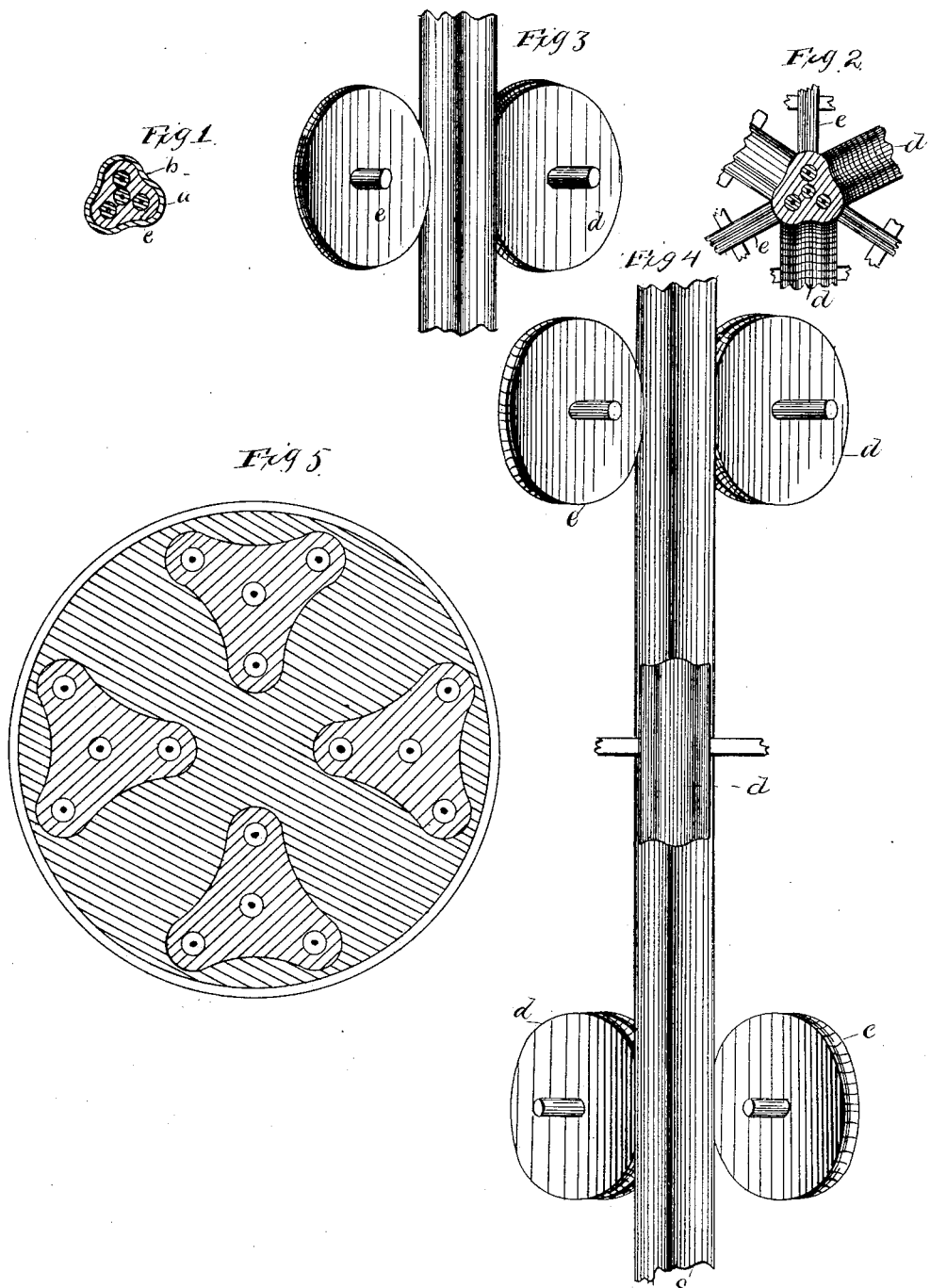

J. BURROWS HYDE, OF NEW YORK, N. Y.

UNDERGROUND ELECTRIC CONDUCTOR OR CABLE.

SPECIFICATION forming part of Letters Patent No. 277,036, dated May 8, 1883.

Application filed February 7, 1883. (No model.)

*To all whom it may concern:*

Be it known that I, J. BURROWS HYDE, a citizen of the United States, residing in the city, county, and State of New York, have invented certain new and useful Improvements in the Construction, Preparation, and Training of Underground Electric Conductors or Cables, of which the following is a specification, reference being had therein to the accompanying drawings.

My invention relates particularly to that class of underground electric conductors which consists of insulated wires covered with an arming of lead; and my improvement consists in the peculiar structure of such cable, that enables me to form two or more distinct cables simultaneously from the same press and die. At the same time the peculiar structure of the cables affords me the largest number of wires for the like proportion of lead with equal ductility of cable.

My improvement consists, also, in the economical form of the cable in its cross-section, and in condensing the lead arming by pressure-rollers to insure homogenity of the lead and to prevent leakage; and also in covering or coating the lead with non-conducting adhesive media as a protection to preserve it from decomposition and loss of conducting power.

It further consists in the equilateral configuration of the cable approaching a triangle, whereby an insulated wire is carried in each angle and one in the center, and which, when produced, I claim as an article of manufacture, as product of a machine which I propose to patent hereafter, and in further details of construction, as will hereinafter more fully appear.

Figure 1 represents a view in cross-section of the cable complete. Figs. 2 and 3 represent end and plan views of pressure-rollers for condensing the lead arming. Fig. 4 is a perspective view of the series of rollers with the cable passing through them, and Fig. 5 is a view in cross-section of four cables passing simultaneously through a compound die.

$s$ shows the cable; $a$, the wires; $b$, the insulation; $c$, the lead arming; $d'$, the adhesive exterior coating; $d\,e$, the pressure-rollers, placed opposite each other in pairs, the bearing-surfaces cut away to fit the cable-surfaces and rotated by the friction of the cable as drawn through them, or they may be provided with toothed wheels upon their axles to be rotated by power.

In the construction of my cable I first prepare the wires, preferring to wind them with cotton thread in the usual manner, and saturate this covering with an insulating medium or compound, as asphaltum, boiled linseed-oil, and waste rubber or other equivalent substance. Such prepared wires, wound upon proper reels, are conducted into a press similar to those for constructing lead pipe, and which are usually employed for making lead-covered cables, for which purpose the forming-die is constructed for the especial cable to be made. In my own case I prepare a compound die that shall simultaneously form four cables, each with four wires, constituting sixteen wires that pass from their reels at the same time into the press, and which operation, by the peculiar structure of my cable, enables me to do, as I construct my lead-covered conductor with three sides, approximating in their position to an equilateral triangle with the angles rounded off, and the three sides slightly depressed or curved inwardly, the whole being of such proportion as will admit of four insulated wires, one of such wires being in each rounded angle and one in the center of the three.

This described construction of the cable renders it very pliable and convenient in laying down for use. It will furthermore carry the largest practical number of wires for its sectional area, being at the same time the most economical shape for manufacturing.

In forming a lead-covered cable the melted lead is poured from a proper fount into the cylinder of the press and forced therefrom through the dies by hydrostatic pressure. Two difficulties are liable to arise therefrom: First, the heat from the lead may liquefy the insulation, and this in a fluid state be pressed from the fibrous covering and accumulate until released by small openings forced through the arming, as "pin-holes," which admit moisture to the impoverished fiber coating when the cable is laid; second, the lead during the last working of the charge having lost much of its heat tends to solidification, hence when pressed out will give a coating more or less granulated, as lead manipulated by a plumber in making a "wipe-joint." To obviate this I prefer to subject the cable as it passes from the press, or afterward, to a condensing process by compression-rollers placed opposite each other in three divisions or sections, the faces of the rollers being made to fit the surfaces of the cable at their points of contact and made smoother or serrated, as may be found preferable, and by proper gearing made to move with the speed of the propelled cable.

The compound cable should be coated thoroughly with a non-conducting adhesive substance. This may be done by drawing it through a sponge or other convenient application saturated with melted asphalt and oil, or any proper resinous media, and should be repeated where thickness is required, to prevent its decomposition and preserve its conducting power.

Having thus described my invention, what I claim is—

1. An electric cable comprising a body of metal formed with three concave sides, the body approximating in cross-section to an equilateral triangle, as described, having within said body insulated electrical conductors, for the purpose set forth.

2. As an article of trade and manufacture, a compound electric cable having three equal sides, with angles rounded, and an insulated conducting-wire embedded within each angle, substantially as described.

3. The method herein described of solidifying the lead armor of an electric cable, which consists in passing the cable through pressure-rollers, such pressure being applied simultaneously as the cables emerge from the press or from reels, substantially as set forth.

4. A lead-covered electric cable having an exterior covering or coating of non-conducting adhesive medium to protect the lead against decomposition and consequent entrance of moisture to the inclosed wires, as described.

5. An electric lead-covered cable triangular in cross-section, and having conducting-wires embedded therein, the outer surface of said cable being roughened or serrated and coated with an adhesive material, as set forth.

In testimony whereof I affix my signature in presence of two witnesses.

J. BURROWS HYDE.

Witnesses:
   J. H. HARRIS,
   HENRY SMITH.